United States Patent
Nakajima et al.

(10) Patent No.: US 11,163,272 B2
(45) Date of Patent: Nov. 2, 2021

(54) SERVO PARAMETER ADJUSTMENT DEVICE AND SERVO PARAMETER ADJUSTMENT METHOD

(71) Applicant: OMRON Corporation, Kyoto (JP)

(72) Inventors: Kenji Nakajima, Hannan (JP); Mamoru Egi, Otsu (JP); Yasushi Ono, Kusatsu (JP); Fumiaki Sato, Kyoto (JP)

(73) Assignee: OMRON Corporation, Kyoto (JP)

( * ) Notice: Subject to any disclaimer, the term of this patent is extended or adjusted under 35 U.S.C. 154(b) by 281 days.

(21) Appl. No.: 16/482,715

(22) PCT Filed: Jan. 30, 2018

(86) PCT No.: PCT/JP2018/002906
§ 371 (c)(1),
(2) Date: Aug. 1, 2019

(87) PCT Pub. No.: WO2018/163662
PCT Pub. Date: Sep. 13, 2018

(65) Prior Publication Data
US 2021/0200166 A1    Jul. 1, 2021

(30) Foreign Application Priority Data
Mar. 9, 2017 (JP) .............................. JP2017-045213

(51) Int. Cl.
G05B 13/04    (2006.01)
G06F 3/0484    (2013.01)
G06F 17/14    (2006.01)

(52) U.S. Cl.
CPC ....... *G05B 13/042* (2013.01); *G06F 3/04847* (2013.01); *G06F 17/142* (2013.01)

(58) Field of Classification Search
CPC .. G05B 13/042; G06F 3/04847; G06F 17/142
See application file for complete search history.

(56) References Cited

U.S. PATENT DOCUMENTS 6,198,246 B1 *  3/2001  Yutkowitz .............. G05B 11/42
                                                         318/561
7,200,464 B2 *  4/2007  Nussbaum ......... G06K 7/10851
                                                         700/186
(Continued)

FOREIGN PATENT DOCUMENTS

JP    H0784608    3/1995
JP    2001006185    1/2001
(Continued)

OTHER PUBLICATIONS

"International Search Report (Form PCT/ISA/210) of PCT/JP2018/002906," dated Apr. 10, 2018, with English translation thereof, pp. 1-5.

(Continued)

*Primary Examiner* — Gary Collins
(74) *Attorney, Agent, or Firm* — JCIPRNET

(57) ABSTRACT

In order to improve usability during parameter adjustment, this adjustment device performs a simulation in which a set value of a servo parameter received during a slide operation period of a slider bar is reflected in a FFT analysis result of response characteristics of speed control or position control, and the simulation display of the frequency characteristics and phase characteristics is updated on the adjustment screen.

16 Claims, 10 Drawing Sheets

(56) References Cited

U.S. PATENT DOCUMENTS

| | | | |
|---|---|---|---|
| 7,219,041 B2* | 5/2007 | Hamann | B23Q 17/24 |
| | | | 700/180 |
| 2007/0118237 A1 | 5/2007 | Wang | |
| 2007/0268068 A1* | 11/2007 | Yutkowitz | H02P 23/0077 |
| | | | 329/325 |
| 2011/0074330 A1 | 3/2011 | Ellis et al. | |
| 2015/0084572 A1* | 3/2015 | Tanaka | G05B 11/36 |
| | | | 318/568.1 |
| 2016/0018466 A1 | 1/2016 | Miklosovic et al. | |
| 2018/0067086 A1* | 3/2018 | Tian | G01N 29/4472 |

FOREIGN PATENT DOCUMENTS

| | | |
|---|---|---|
| JP | 2009122779 | 6/2009 |
| JP | 5172051 | 3/2013 |

OTHER PUBLICATIONS

"Written Opinion (Form PCT/ISA/237) of PCT/JP2018/002906", dated Apr. 10, 2018, with English translation thereof, pp. 1-6.
"Partial supplementary search report of Europe Counterpart Application", dated Dec. 4, 2020, p. 1-p. 14.
R&S RTO, "Digital Oscilloscope User Manual", retrieved on Jan. 29, 2018, available at: http://gepoc.ct.ufsm.br/equip/manuais/Manual_RTO1004.pdf.
"Search Report of Europe Counterpart Application", dated Mar. 18, 2021, pp. 1-19.

* cited by examiner

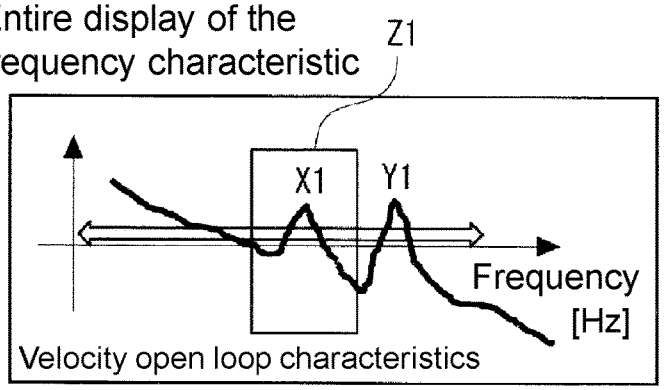
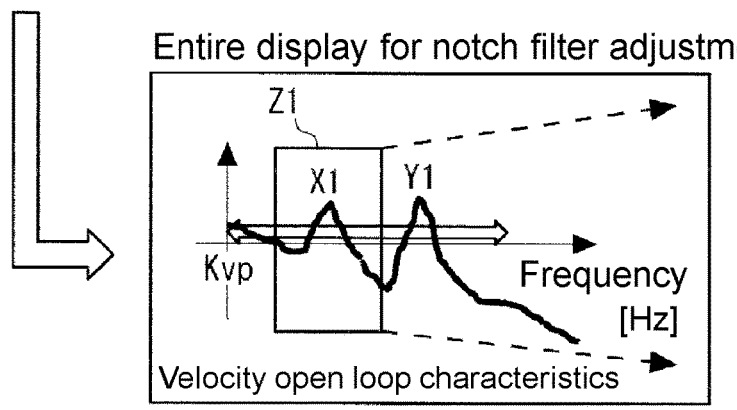
FIG. 8
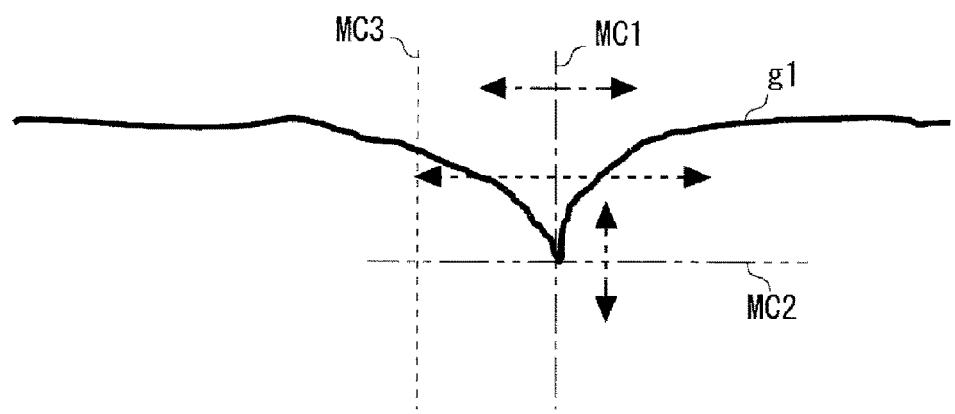
FIG. 9

(1)

At the time of FFT execution,
Display band is MAX range
(Example: 1 to 4000 [Hz])
Entire Bode plot is displayed (2)

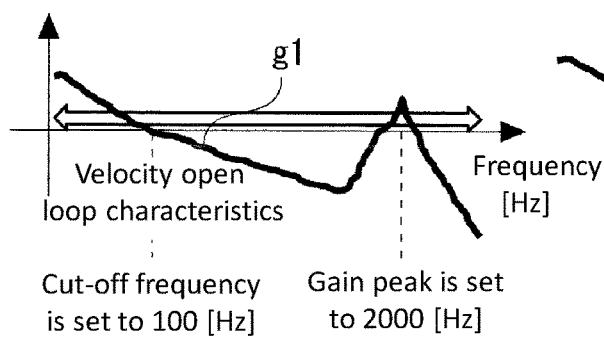

Cut-off frequency is set to 100 [Hz]    Gain peak is set to 2000 [Hz]

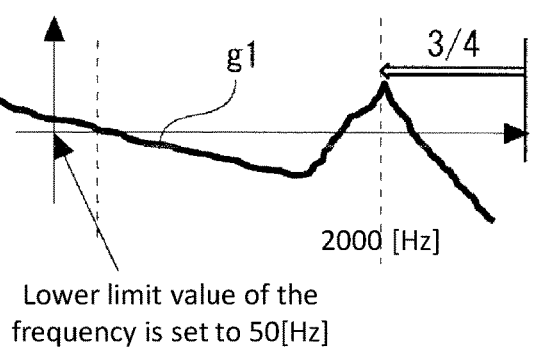

Lower limit value of the frequency is set to 50[Hz]

The user would like to enlarge to confirm the gain peak. The approximate frequency can be determined.

For example, 3/4 of the maximum display area of the Bode plot is the determined frequency, and enlargement and reduction are performed centering on this frequency

FIG. 11

SERVO PARAMETER ADJUSTMENT DEVICE AND SERVO PARAMETER ADJUSTMENT METHOD

CROSS-REFERENCE TO RELATED APPLICATION

This application is a 371 of international application of PCT application serial no. PCT/JP2018/002906, filed on Jan. 30, 2018, which claims the priority benefit of Japanese application serial no. 2017-045213, filed on Mar. 9, 2017. The entirety of each of the abovementioned patent applications is hereby incorporated by reference herein and made a part of this specification.

BACKGROUND

Technical Field

The disclosure relates to a servo parameter adjustment device and a servo parameter adjustment method.

Description of Related Art

Conventionally, a servo parameter adjustment device may be used in the factory automation (FA) field, the robot field and the like in which a servo control is performed so as to follow a target value as a control amount such as position, orientation, posture and the like of a control target. The servo control of the control target is performed by a servo control device that automatically controls a motor that drives the control target and a motor to follow the target value. In the servo control device, servo control parameters (servo parameters) that control the motor according to the type of the control target, the type of the control method, the characteristics of the motor that drives the control target and the like are adjusted by a connected servo parameter adjustment device.

In the servo parameter adjustment device, for example, characteristics (servo parameters) of a torque filter that limits an output torque of the motor and a notch filter that suppresses mechanical resonance at the time of the servo control are adjusted to be optimal. The servo control device performs, for example, a speed control of the motor in accordance with preset servo parameters and measures the motor speed under control. The servo parameter adjustment device performs a fast Fourier transform (FFT) analysis based on data of the measured motor speed and displays the analysis result as a Bode plot on a screen such as a liquid crystal display (LCD).

A person using (hereinafter also referred to as the "user") the servo parameter adjustment device refers to a frequency characteristic and a phase characteristic displayed in the Bode plot and, for example, sets the servo parameters of the notch filter so that the response characteristics of the motor suppress mechanical resonance. For example, the user performs a simulation analysis of the response characteristics based on the set notch filter characteristics and reflects the adjusted filter characteristics in the servo parameters as a result of the analysis. In the servo control device, the speed control of the motor is performed based on the servo parameters after adjustment, and confirmation of the filter effects after adjustment is performed.

In addition, the following patent document exists as a prior art document in which techniques related to the techniques described in the disclosure are recited.

RELATED ART

Patent Document

[Patent Document 1] Japanese Patent No. 5172051

SUMMARY

Technical Problem

Incidentally, when adjusting the filter characteristics that suppress mechanical resonance, the user has been required to accurately read a resonance frequency at which a gain value becomes a peak from the frequency characteristic. Then, when performing the simulation analysis, in order to obtain desired filter characteristics, the user has been required to set the read resonance frequency and the narrowness (the value of the quality factor (Q value)), the degree of suppression (the depth), and the like of the stop band width to the servo parameter adjustment device by manual input. When the simulation analysis is repeated, each time the simulation is executed, the above-described manual input operation for adjusting the filter characteristics is performed, and then the button operation for the simulation execution is performed.

The disclosure has been made in consideration of the above problems, and an object of the disclosure is to provide a technique that improves usability of a servo parameter adjustment device during parameter adjustment related to the servo control.

Solution to the Problem

The disclosure is exemplified by a servo parameter adjustment device.

That is, a servo parameter adjustment device includes a parts that displays an adjustment screen for adjusting a servo parameter set in a servo control device of a motor that drives a control target; a reception parts that receives a set value of the servo parameter which is variable according to an operation direction and an operation amount associated with a slide operation of a slider bar displayed on the adjustment screen; a calculation parts that performs an FFT analysis of a response characteristic of a speed control or a position control of the motor performed according to a predetermined servo parameter and generates graph data of a frequency characteristic and a phase characteristic for displaying an FFT analysis result of the response characteristic on the adjustment screen; and a display control parts that displays the frequency characteristic and the phase characteristic in a predetermined area of the adjustment screen based on graph data generated by the calculation parts, wherein the calculation parts performs a simulation in which a set value of the servo parameter received during a slide operation period of the slider bar is reflected in an FFT analysis result of a response characteristic of the speed control or the position control and generates graph data of the simulated frequency characteristic and phase characteristic, and the display control parts updates a display of a frequency characteristic and a phase characteristic of the adjustment screen based on graph data of the simulated frequency characteristic and phase characteristic.

According to this configuration, when characteristics of a torque filter and a notch filter are adjusted, a simulation graph for predicting effects of the torque filter and the notch filter can be updated according to the operation amount of the slider bar displayed on the adjustment screen. Since the user who adjusts the above filter characteristics can adjust the servo parameters based on the shape of the simulation graph which changes in accordance with the operation amount of the slider bar, the filter characteristics can be adjusted with ease and in a short time.

Further, in the disclosure, the calculation parts may reduce an accuracy of a frequency resolution at the time of an FFT analysis and perform a simulation during a slide operation period of the slider bar. Further, the calculation parts may limit a frequency range used at the time of an FFT analysis and perform a simulation during a slide operation period of the slider bar. According to this configuration, the calculation load at the time of a simulation can be reduced, and the responsiveness of the update display of the simulation graph can be improved.

Further, in the disclosure, the reception parts may receive a set value of the servo parameter which is variable according to an indication direction and an indication position associated with an operation of a plurality of measuring cursors displayed superimposed on graph data of a frequency characteristic and a phase characteristic displayed in a predetermined area of the adjustment screen. According to this configuration, the plurality of measuring cursors can be operated to set the shape of the notch filter graphically according to the shape of the simulation graph for predicting the notch filter effects.

Further, in the disclosure, the reception parts may receive a set value of the servo parameter which is variable according to an operation direction and an operation amount associated with a slide operation of a slider bar displayed on the adjustment screen and according to an operation amount of buttons for fine adjustment provided at both ends of the slider bar. According to this configuration, the setting accuracy with respect to the set value of the servo parameter can be improved with use of the operation amounts of the slider bar and the buttons for fine adjustment.

Further, in the disclosure, the reception parts may receive a predetermined operation input to a cursor displayed superimposed on graph data of a frequency characteristic and a phase characteristic displayed in a predetermined area of the adjustment screen, and the display control parts may perform an enlarged display or a reduced display of graph data of the frequency characteristic and the phase characteristic centering on a frequency indicated by the cursor when the predetermined operation input is performed. According to this configuration, the enlarged display/reduced display operation in the vicinity of a mechanical resonance peak at which the center frequency of the notch filter is set can be facilitated with use of click operations and wheel operations of a mouse and the like.

Further, in the disclosure, when an enlarged display or a reduced display of graph data of the frequency characteristic and the phase characteristic is performed, the display control parts may convert and receive an operation amount associated with a slide operation of the slider bar in association with a relative ratio of the enlarged display or a relative ratio of the reduced display. According to this configuration, since the operation amount associated with the slide operation of the slider bar can be associated with the enlargement ratio/reduction ratio of the display, the frequency setting adjustment of the filter characteristics is facilitated.

Further, in the disclosure, the reception parts may receive an adjustment selection for a predetermined servo parameter displayed on the adjustment screen, and the display control parts may limit a display target displayed on the adjustment screen according to a type of the predetermined servo parameter for which the adjustment selection has been received. According to this configuration, the processing load at the time of simulation update display can be reduced, and the user who adjusts the notch filter characteristics can be presented with minimum necessary display information from among a plurality pieces of display information displayed on the adjustment screen.

Further, in the disclosure, the display control parts may search from a low frequency area for a peak frequency at which a gain value related to the speed control reaches a peak from graph data of the frequency characteristic, and set and display the searched peak frequency as an initial value of a slider bar, which is operated by a slide operation, of a servo parameter to be adjusted. According to this configuration, the mechanical resonance peak at which the center frequency of the notch filter is set can be automatically identified. Further, since the user can set the filter width and the filter depth of the notch filter characteristics with the set initial value as an index, the notch filter characteristics can be adjusted with ease and in a short time.

Further, in the disclosure, when a plurality of searched peak frequencies exist, the display control parts may sort the peak frequencies in ascending order, and set and display the sorted peak frequencies as initial values of slider bars, which are operated by slide operations, of servo parameters to be adjusted. According to this configuration, when a plurality of mechanical resonance peaks exist, the adjustment order of setting the notch filters can be assisted.

Further, in the disclosure, when an adjustment state of a servo parameter of which the searched peak frequency is set and displayed as an initial value of a slider bar satisfies a predetermined condition, the display control parts may extract and display in enlargement graph data of a predetermined frequency range centering on at least the peak frequency. According to this configuration, since the frequency range necessary for adjusting the notch filter characteristics can be limited and displayed in enlargement, the easiness of adjusting the filter width and the filter depth can be improved.

Further, in the disclosure, the display control parts may display graph data before extraction together with the graph data displayed in enlargement. According to this configuration, the filter characteristics can be adjusted while the positioning of the frequency band as the target of the notch filter setting in the graphically displayed frequency range is being confirmed.

Further, in the disclosure, the display control parts may limit a frequency range of graph data before extraction, which is displayed together with the graph data displayed in enlargement. According to this configuration, the minimum information necessary at the time of adjusting the filter characteristics can be displayed even when the area size in which the graph data is displayed is limited.

Further, in the disclosure, the display control parts may limit a lower limit value of a frequency of graph data before extraction, which is displayed together with the graph data displayed in enlargement, to a vicinity of a velocity proportional gain related to a speed control. According to this configuration, the filter characteristics including the set frequency of the velocity proportional gain necessary at the time of adjusting the filter characteristics can be adjusted.

Further, in the disclosure, when an operation amount of the slider bar is a frequency, the reception parts may receive a logarithmic frequency obtained by logarithmically converting the frequency as a set value. According to this configuration, the responsiveness to the operation of the slider bar is improved, and the frequency setting adjustment of the filter characteristics is facilitated.

Further, in the disclosure, the reception parts may hold the servo parameter received through a slide operation of the slider bar. According to this configuration, the held notch filter characteristics can be reused.

Further, the disclosure may provide a servo parameter adjustment method in which a servo parameter adjustment device executes a step that displays an adjustment screen for adjusting a servo parameter set in a servo control device of a motor that drives a control target; a reception step that receives a set value of the servo parameter which is variable according to an operation direction and an operation amount associated with a slide operation of a slider bar displayed on the adjustment screen; a calculation step that performs an FFT analysis of a response characteristic of a speed control or a position control of the motor performed according to a predetermined servo parameter and generates graph data of a frequency characteristic and a phase characteristic for displaying an FFT analysis result of the response characteristic on the adjustment screen; and a display control step that displays the frequency characteristic and the phase characteristic in a predetermined area of the adjustment screen based on graph data generated by the calculation parts, wherein the calculation step performs a simulation in which a set value of the servo parameter received during a slide operation period of the slider bar is reflected in an FFT analysis result of a response characteristic of the speed control or the position control and generates graph data of the simulated frequency characteristic and phase characteristic, and the display control step updates a display of a frequency characteristic and a phase characteristic of the adjustment screen based on graph data of the simulated frequency characteristic and phase characteristic.

Further, the disclosure can be specified as a servo parameter adjustment device including at least a part of the above parts and processing. The above processing and parts can be freely combined and implemented as long as no technical contradiction arises.

Effects

According to the disclosure, the usability of the servo parameter adjustment device during parameter adjustment related to the servo control can be improved.

BRIEF DESCRIPTION OF THE DRAWINGS

FIG. 8 is a diagram for illustrating limitation of a frequency range used for an entire display for notch filter adjustment.

FIG. 9 is a diagram for illustrating an operation of setting filter characteristics in accordance with the shape of the notch filter.

FIG. 11 is a diagram for illustrating the limitation of the display range during the enlargement/reduction operation.

DESCRIPTION OF THE EMBODIMENTS

Hereinafter, a servo parameter adjustment device according to an embodiment will be described with reference to the drawings. The configuration of the following embodiment is an example, and the servo parameter adjustment device of the disclosure is not limited to the configuration of the embodiment.

<1. Device Configuration>

Figure 1:
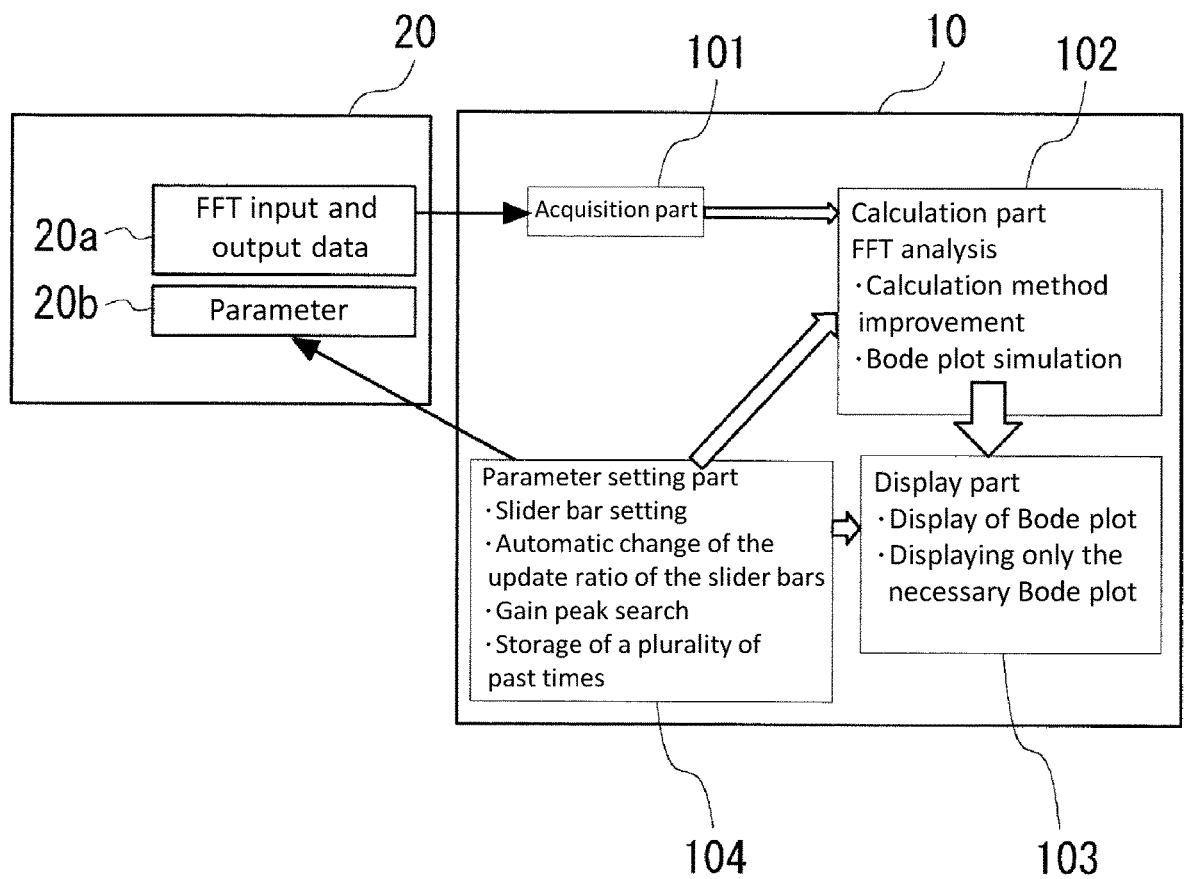
FIG. 1 is a diagram showing a configuration example of a servo parameter adjustment device according to an embodiment.

FIG. 1 is a diagram showing a configuration example of a servo parameter adjustment device 10 according to the embodiment. As shown in FIG. 1, the servo parameter adjustment device (hereinafter also simply referred to as the "adjustment device") 10 is connect to a servo control device (hereinafter also simply referred to as the "control device") 20 via a network such as a local area network (LAN).

The control device 20 is connected with a motor that drives a control target and various sensors that detect the position, orientation, posture, motor speed and the like of the control target as control amounts. In the control device 20, a servo control of the motor according to deviations between the control amounts detected by the various sensors and target values is performed in accordance with servo parameters. A proportional-integral-differential (PID) control, for example, is adopted as a control method of the servo control. By parts of the PID control, for example, the motor that drives the control target is automatically controlled to feedback a detected motor speed (a control amount) to follow a target value. The adjustment device 10 connected to the control device 20 adjusts the servo parameters set in the control device 20 based on an operation input of the user. The servo parameters appropriately adjusted according to the type of the control target, the type of the control method, the characteristics of the motor that drives the control target, and the like are set in the control device 20 after adjustment.

The control device 20 has a memory that holds the servo parameters and data detected by the various sensors. FFT input and output data 20a, in which measurement data measured by the sensors is held, and parameters 20b, in which the servo parameters are held, are provided in a storage area of the memory. At the time of adjusting the servo parameters, the control device 20 performs the servo control of the motor according to the servo parameters set in the parameters 20b, and stores various measurement data detected by the sensors in the FFT input and output data 20a.

The adjustment device 10 according to the embodiment includes an acquisition part 101, a calculation part 102, a display part 103, and a parameter setting part 104 in the functional configuration. The adjustment device 10 is provided, for example, as a computer such as a personal computer (PC) having a hardware configuration as shown in FIG. 2.

Figure 2:
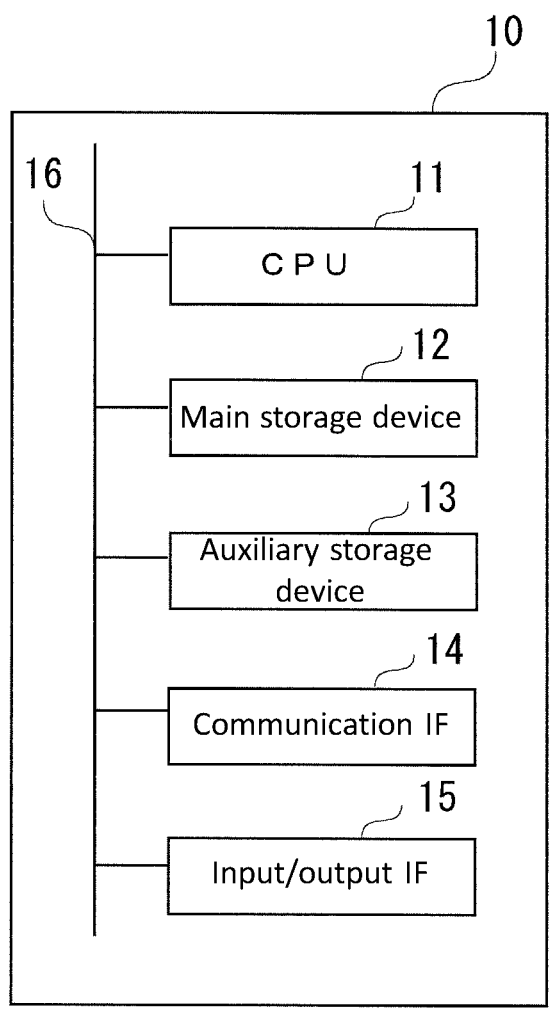
FIG. 2 is a diagram showing a hardware configuration example of the servo parameter adjustment device.

The adjustment device 10 of FIG. 2 includes a central processing unit (CPU) 11, a main storage device 12, an auxiliary storage device 13, a communication interface (IF) 14, and an input and output IF 15 mutually connected by a connection bus 16. The CPU 11 is also called a microprocessor (MPU) or a processor. However, the CPU 11 is not limited to a single processor and may have a multiprocessor configuration. Further, a single CPU 11 connected by a single socket may have a multi-core configuration. The main storage device 12 and the auxiliary storage device 13 are recording media readable by the adjustment device 10.

In the adjustment device 10, the CPU 11 develops programs stored in the auxiliary storage device 13 into a work area of the main storage device 12 so as to be executable and controls peripheral machines through the execution of the programs, whereby the adjustment device 10 provides functions meeting predetermined purposes. The CPU 11 is a central processing unit that controls the entire adjustment device 10. The CPU 11 performs processing in accordance with the programs stored in the auxiliary storage device 13. The main storage device 12 is a storage medium in which the CPU 11 caches programs and data and develops a work area. The main storage device 12 includes, for example, a flash memory, a random access memory (RAM), and a read only memory (ROM). The auxiliary storage device 13 is a storage medium that stores the programs to be executed by the CPU 11, setting information of operations, and the like. The auxiliary storage device 13 is, for example, a hard-disk drive (HDD), a solid state drive (SSD), an erasable programmable ROM (EPROM), a flash memory, a USB memory, a secure digital (SD) memory card, or the like. The communication IF 14 is an interface with a network and the like connected to the adjustment device 10. The input and output IF 15 is an interface that performs data input and output between the adjustment device 10 and machines connected thereto. Further, each of the above-described components may be provided in a plurality, and some of the components are not necessarily provided.

Setting of the servo parameters and acquisition of measurement data measured at the time of adjusting the servo parameters between the adjustment device 10 and the control device 20 connected by a network are performed via the communication IF 14. Similarly, the user's operation input using an input device, such as a pointing device, a keyboard and the like, is received via the input and output IF 15. The pointing device includes a mouse, a touch panel, and the like. Further, display data and information are output to a display device such as an LCD via the input and output IF 15.

The adjustment device 10 provides the functions of each processing part of the acquisition part 101, the calculation part 102, the display part 103, and the parameter setting part 104 by the CPU 11 executing the programs. However, at least part of the processing of the above processing parts may be provided by a digital signal processor (DSP), an application specific integrated circuit (ASIC), and the like. In addition, at least a part of the above processing parts may be a dedicated large scale integration (LSI), such as a field-programmable gate array (FPGA), a numerical processor, a vector processor, an image signal processor and the like, or other digital circuits. In addition, at least a part of the above processing parts may include an analog circuit. The adjustment device 10 includes the auxiliary storage device 13 as a storage destination of data referred to or managed by the above processing parts.

Figure 3:
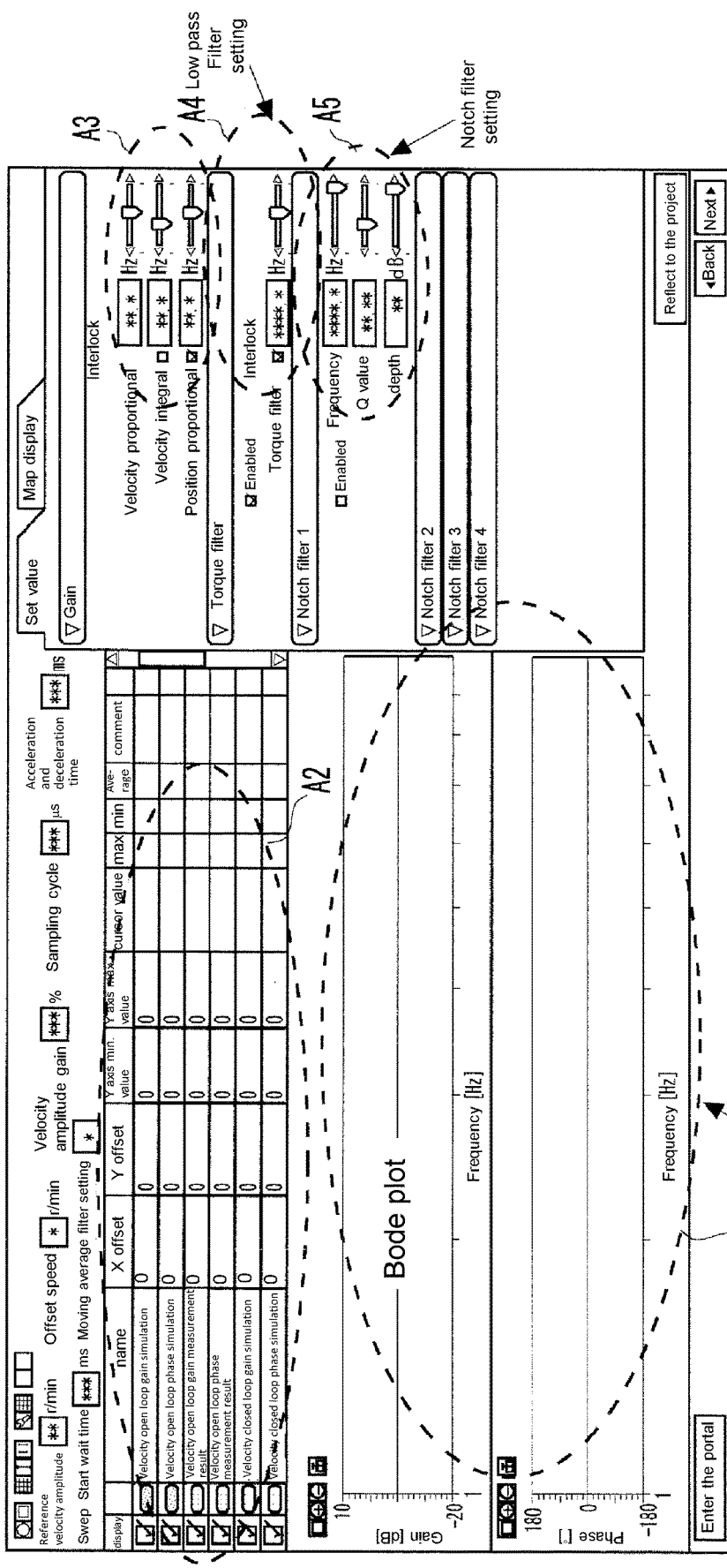
FIG. 3 is a diagram showing an example of the servo parameter adjustment screen according to an embodiment.

In the adjustment device 10 according to the embodiment, a program for adjusting the servo parameters is activated by the user operation at the time of adjusting the servo parameters. A servo parameter adjustment screen to be described later with reference to FIG. 3 is displayed on a display device such as an LCD along with the activation of the program. In the adjustment device 10, adjustment work of the user is performed based on a frequency characteristic and a phase characteristic of a Bode plot displayed on the servo parameter adjustment screen so that response characteristics related to the servo control of the motor become appropriate.

In the adjustment work, characteristics (servo parameters) of a torque filter that limits an output torque of the motor and a notch filter that suppresses mechanical resonance are set and changed, for example, with reference to the frequency characteristic and the phase characteristic of the Bode plot. Then, a simulation of the response characteristics based on the filter characteristics after change is performed, and evaluation confirmation of the filter effect after change is performed. The user repeats the above adjustment work to optimize the response characteristics related to the servo control of the motor.

The adjustment device 10 according to the embodiment provides the processing functions of the acquisition part 101, the calculation part 102, the display part 103, and the parameter setting part 104, thereby improving the adjustment easiness of the adjustment work in which the simulation is repeated due to setting change of the filter characteristics.

<2. Processing Configuration>

In the adjustment device 10 of FIG. 1, the acquisition part 101 acquires measurement data stored in the FFT input and output data 20a of the control device 20. The FFT input and output data 20a stores, for example, measurement data acquired by measuring a motor speed under speed control according to a servo parameter set before the servo parameter adjustment at a predetermined cycle interval, such as 100 μs, for a predetermined period. The acquisition part 101 temporarily stores the acquired measurement data in a predetermined area of the main storage device 12 and transfers the measurement data to the calculation part 102.

The calculation part 102 performs an FFT analysis on the measurement data transferred from the acquisition part 101. The calculation part 102 performs, for example, an FFT analysis with 1.92 Hz as a frequency resolution and 4096 points as the number of sampling points. The response characteristics related to the servo control of the motor may be obtained in the FFT analysis result. The calculation part 102 generates data for displaying the response characteristics in a Bode plot (a frequency characteristic and a phase characteristic). The calculation part 102 temporarily stores the generated data in a predetermined area of the main storage device 12 and transfers the generated data to the display part 103.

In addition, the calculation part 102 performs a simulation of the response characteristics related to the servo control of the motor based on a gain value and the filter characteristics related to the PID control transferred from the parameter setting part 104. The calculation part 102 is provided with a function that shortens the calculation time related to the simulation. The processing function during simulation of the response characteristics provided by the calculation part 102 will be described later with reference to FIG. 3. The simulation result of the response characteristics is displayed on a screen such as an LCD as a Bode plot at the time of simulation.

The display part 103 performs a graphical display of a Bode plot based on the data transferred from the calculation part 102. The display part 103 draws, for example, the frequency characteristic and the phase characteristic of the response characteristics related to the servo control of the motor in a Bode plot display area of FIG. 3 to be described later. Further, the display part 103 updates the display mode of the Bode plot at the time of simulation according to, for example, the operation input transferred from the parameter setting part 104. The processing function of the display part 103 provided at the time of updating the display mode will be described later with reference to FIG. 3.

The parameter setting part 104 receives an operation input to a graphical user interface (GUI) element displayed in the servo parameter adjustment screen shown in FIG. 3. The GUI element is, for example, a radio button, a slider bar which can be operated by a slide operation, or the like provided in the screen. Further, the parameter setting part 104 receives an operation input such as a click operation on a graph displayed in the Bode plot. The parameter setting part 104 transfers the received operation input to the calculation part 102 and the display part 103 according to the type of the operation target.

<3. Processing Example>

Hereinafter, a user interface provided by the adjustment device 10 according to the embodiment will be described with reference to the drawings in FIGS. 3 to 12. FIG. 3 is an example of the servo parameter adjustment screen according to an embodiment. The characteristics (the servo parameters) of the torque filter and the notch filter related to the servo control of the motor of the control device 20 are set via the servo parameter adjustment screen (hereinafter also referred to as the "adjustment screen") illustrated in FIG. 3.

On the adjustment screen of FIG. 3, the Bode plot is displayed in an area A1 circled by a broken line. The Bode plot is composed of the frequency characteristic with a gain (dB) as the vertical axis and a frequency (Hz) as the horizontal axis, and the phase characteristic with a phase (°) as the vertical axis and a frequency (Hz) as the horizontal axis. On the adjustment screen, response characteristics selected from among a plurality types of response characteristics shown in an area A2 circled by a broken line are displayed as graphs in the Bode plot in the area A1.

A velocity open loop gain measurement result and a velocity open loop phase measurement result in the area A2 represent an FFT analysis result of the measurement data acquired from the control device 20. Similarly, a velocity open loop gain simulation, a velocity open loop phase simulation, a velocity closed loop gain simulation, and a velocity closed loop phase simulation represent, for example, simulation results based on the filter characteristics set via the adjustment screen.

Areas A3, A4, and A5 for adjusting the characteristics (the servo parameters) of the torque filter and the notch filter related to the servo control of the motor are displayed on the right side of the adjustment screen. Each area is displayed together with a name bar in which the name of the adjustment item, such as "gain", "torque filter", and "notch filter," is described. Further, in the servo control, a plurality of mechanical resonance points may exist. Therefore, a plurality of adjustment items (such as notch filter 1 to notch filter 4) are provided for the notch filter. For example, the user operates a mouse, performs a click operation in a state where the cursor or the like is superimposed on the name bar displayed on the adjustment screen, and selects a notch filter to be adjusted.

The area A3 displays an area for adjusting a velocity proportional gain, a velocity integral gain, and a position proportional gain related to the PID control of the control device 20. The area A4 displays an area for adjusting a cut-off frequency of the torque filter (the low pass filter) that limits the output torque of the motor. The area A5 displays a plurality of areas for adjusting the characteristics of the notch filters that suppress mechanical resonance. The characteristics of the notch filter are represented by a "frequency" indicating a center frequency of the notch filter, a "Q value" indicating a filter width of the notch filter, and a "depth" indicating a filter depth of the notch filter.

Slider bars which can be operated by slide operations by the user are displayed as GUI elements in the areas A3, A4, and A5. Rectangular display areas (hereinafter also referred to as the "display boxes") representing control values set via the slider bars are provided on the left side of the slider bars. The values displayed in the display boxes increase/decrease according to operation directions and operation amounts of the slider bars. For example, when the slider bar associated with the center frequency of the notch filter in the area A5 is operated, the frequency value displayed in the display box increases/decreases according to the slide operation direction and the movement amount of the slide operation.

Further, button elements that can be adjusted to increase or decrease the control values set by the slider bars are displayed as GUI elements at both ends of the slider bars. For example, the control value increases and changes in predetermined unit steps through the click operation on the button element provided on the right end side of the slider bar. Similarly, the control value decreases and changes in predetermined unit steps through the click operation on the button element provided on the left end side of the slider bar. At the time of operating the slider bar associated with the center frequency of the notch filter, the user can finely adjust the frequency associated with the slide operation through, for example, the click operation on the button elements displayed at both ends of the slider bar. The adjustment device 10 can set the control values set by the slider bars with high accuracy.

Here, exemplified as the adjustment amounts of the unit steps allocated to the button elements displayed at both ends of the slider bars are, for example, "0.1 Hz" in the case of frequency, "0.01" in the case of Q value, and "1 dB" in the case of depth. The adjustment amount of the unit step allocated to the button element may be adjustable in conjunction with the numerical value of the lowest order of the control amount to be operated by the slider bar.

The adjustment of the servo parameters is performed in the following procedure. First, in order to confirm the stability of the response characteristics related to the servo control of the motor, the user sets predetermined servo parameters in the control device 20 and measures the response characteristics in a velocity open loop state. The measurement results are graphically displayed in the Bode plot in the area A1 as the velocity open loop gain measurement result and the velocity open loop phase measurement result. The velocity open loop gain measurement result is displayed as the frequency characteristic graph of the Bode plot, and the velocity open loop phase measurement result is displayed as the phase characteristic graph of the Bode plot.

Next, the user refers to each graph of the Bode plot displayed in the area A1 to adjust the characteristics (the servo parameters) of the torque filter and the notch filter related to the servo control of the motor. For example, at the time of adjusting the torque filter characteristic, the user performs a click operation on the name bar "torque filter" in the area A4 to select the adjustment item. Then, the user refers to the frequency change of the gain of the frequency characteristic graph, changes the cut-off frequency of the torque filter that limits the output torque of the motor via the slider bar and the operation buttons for fine adjustment, and then repeats simulations of the response characteristics in the velocity open loop and the velocity closed loop as appropriate.

The simulation results are displayed, for example, as velocity open loop and velocity closed loop gain simulation graphs and velocity open loop and velocity closed loop phase simulation graphs in the Bode plot. Each simulation graph can be displayed superimposed in the Bode plot in the area A1 together with the velocity open loop gain measurement result and the velocity open loop phase measurement result by, for example, making the respective display colors different.

The same work is performed when the notch filter characteristics are adjusted. For example, the user performs a click operation on the name bar "notch filter 1" in the area A5 to select the adjustment item. Then, the user refers to the mechanical resonance point of the frequency characteristic graph, changes the center frequency, the filter width (the Q value), and the filter depth of the notch filter by operating the slider bars and the operation buttons for fine adjustment, and then repeats simulations of the response characteristics in the velocity open loop and the velocity closed loop as appropriate. The simulation results are displayed, for example, superimposed in the Bode plot in the area A1 together with the velocity open loop gain measurement result and the velocity open loop phase measurement result.

When the stability of the response characteristics related to the servo control of the motor are confirmed by each simulation, the user sets the adjusted servo parameters in the control device 20 and measures the response characteristics of the velocity open loop and the velocity closed loop states. If the desired response characteristics cannot be obtained in the measurement results, the user repeatedly executes the above procedure with use of the adjustment device 10 to adjust appropriate servo parameters.

The adjustment device 10 according to the embodiment provides the following user interface at the time of adjusting the filter characteristics as described above.

(Case 1)

At the time of simulating the torque filter and notch filter characteristics as described above, the adjustment device 10 reflects the operation amounts (the cut-off frequency, the center frequency, and the filter width (Q value) and depth) that change in accordance with the user's operations of the slider bars and the operation buttons for fine adjustment in the simulations. Hereinafter, "the slider bars and the operation buttons for fine adjustment" are also referred to as "the slider bars and the like".

The simulation of the notch filter characteristics is performed, for example, on the adjustment screen shown in FIG. 3 based on the set values of the center frequency, the filter width (the Q value), and the filter depth of the notch filter when the radio button is "enabled". In Case 1, when the slider bars and the like are operated when the radio button is "enabled", the adjustment device 10 acquires each set value that changes according to the operation amount in real time and reflects it in the simulation graph displayed in the Bode plot.

The user, while confirming on the adjustment screen the shape of the notch filter (the center frequency and the filter width and depth) which changes in accordance with the operation amounts of the slider bars and the like, can identify the filter effect through the shape change of the simulation graph reflecting the shape of the notch filter. The adjustment device 10 provides, for example, a user interface that can graphically adjust the notch filter shape (the center frequency and the filter width and depth) while the notch filter set values and the shape of the simulation graph displayed in the Bode plot are being confirmed.

In the adjustment device 10 of Case 1, an adjustment process such as the simulation execution operation for confirming the effect of the filter characteristics and the trial and error for setting the appropriate filter characteristics can be omitted. As a result, the adjustment device 10 can shorten the adjustment time for adjusting the notch filter shape and can improve the adjustment easiness.

Specifically, for example, regarding the simulation while the slider bars and the like are being operated, the adjustment device 10 makes the frequency resolution coarse when performing the FFT analysis reflecting the notch filter shape. For example, the adjustment device 10 shortens the calculation time related to the Bode plot display of the simulation data by setting the frequency resolution of 1.92 Hz to 2 to 4 times of the frequency resolution. By shortening the calculation time, the adjustment device 10 can reduce the load related to the simulation calculation and can perform real-time simulation update display while the slider bars are being operated.

Further, in the notch filter shape, the filter width and the filter depth are determined in accordance with the peak frequency of the mechanical resonance point. For this reason, regarding the simulation while the slider bars and the like are being operated, the adjustment device 10 may perform the calculation of the frequency characteristic limited to the frequency band affected by the notch filter.

For example, a measurement result on which the FFT analysis has been performed or a simulation result can be used for data outside the frequency band affected by the notch filter of the simulation data displayed in the Bode plot. The adjustment device 10 can improve the real-time property of simulation update display while the slider bars and the like are being operated by performing the calculation of the frequency characteristic limited to the frequency band affected by the notch filter.

Further, the adjustment device 10 can make the slider bar for setting the frequency of the notch filter be a logarithmic slider bar. The adjustment device 10 can improve the operability of the slider bar in the frequency area by making the frequency setting in the slider bar operation be logarithmic.

(Case 2)

The adjustment device 10 may, for example, limit the types of the response characteristics displayed in the Bode plot in the area A1 at the time of adjusting the notch filter characteristics. For adjustment of the notch filter characteristics, measurement results of the velocity open loop characteristics (the phase and the gain) and the velocity closed loop characteristics (the phase and the gain) are referred to. Therefore, in the area A5 shown in FIG. 3, when the name bar "notch filter * (* is an integer from 1 to 4)" is selected, the response characteristics that can be displayed in the Bode plot may be limited to the measurement results of the velocity open loop characteristics (the phase and the gain) and the velocity closed loop characteristics (the phase and the gain) and the simulations.

In addition, when the name bar "notch filter * (* is an integer from 1 to 4)" is selected, the adjustment device 10 may put the adjustment items in the areas A3 and A4 in a non-display state and may display only the adjustment items in the area A5.

The adjustment device 10 can reduce the display load at the time of simulation update display by limiting the content displayed on the adjustment screen and can present minimum necessary display information from among a plurality pieces of display information displayed on the adjustment screen to the user who adjusts the notch filter characteristics. The adjustment device 10 can provide the user who adjusts the notch filter characteristics with an interface that can wipe out confusion in information selection displayed on the adjustment screen.

(Case 3)

At the time of adjusting the notch filter characteristics, when the mechanical resonance frequency is low (close to the velocity proportional gain), if the notch filter shape is set to be deep and the filter width is set to be wide, the phase margin decreases as the open loop response characteristics. When the phase margin decreases, the closed loop response characteristics when the servo control of the motor is performed may become unstable, and vibration may occur. In the response characteristics measured in the open loop, when a plurality of resonance points (resonance frequencies) exist, it is difficult to know for which resonance point the notch filter is to be set and how the frequency range (the filter width and depth) for suppressing mechanical resonance is to be set.

The adjustment device 10 of Case 3 performs a peak search from low frequencies of the frequency characteristic displayed in the Bode plot and identifies a resonance frequency at which mechanical resonance exists. Then, the adjustment device 10 sets the identified resonance frequency to the center frequency of the notch filter operated by the slider bar as an initial value (however, the radio button "enabled" is in a disabled state). When a plurality of peak points exist, the adjustment device 10 sets in ascending order of frequencies for each peak from notch filter 1.

Then, when the radio button "enabled" of the notch filter is selected, the adjustment device 10 displays the entire display for notch filter adjustment and the enlarged display for notch filter adjustment in the area A1 where the Bode plot is displayed. Here, the enlarged display for notch filter adjustment is a screen which enlarges the frequency range in the vicinity of the center frequency (the resonance peak frequency) of the notch filter.

The adjustment device 10 provides the peak search for the resonance frequency, the initial value setting of the searched resonance frequency to the slider bar, and the enlarged screen for notch filter adjustment when the radio button is "enabled," whereby it can support user's notch filter setting order. Further, the adjustment device 10 can improve the adjustment easiness of the frequency range (the filter width and depth) of the notch filter.

Figure 4:
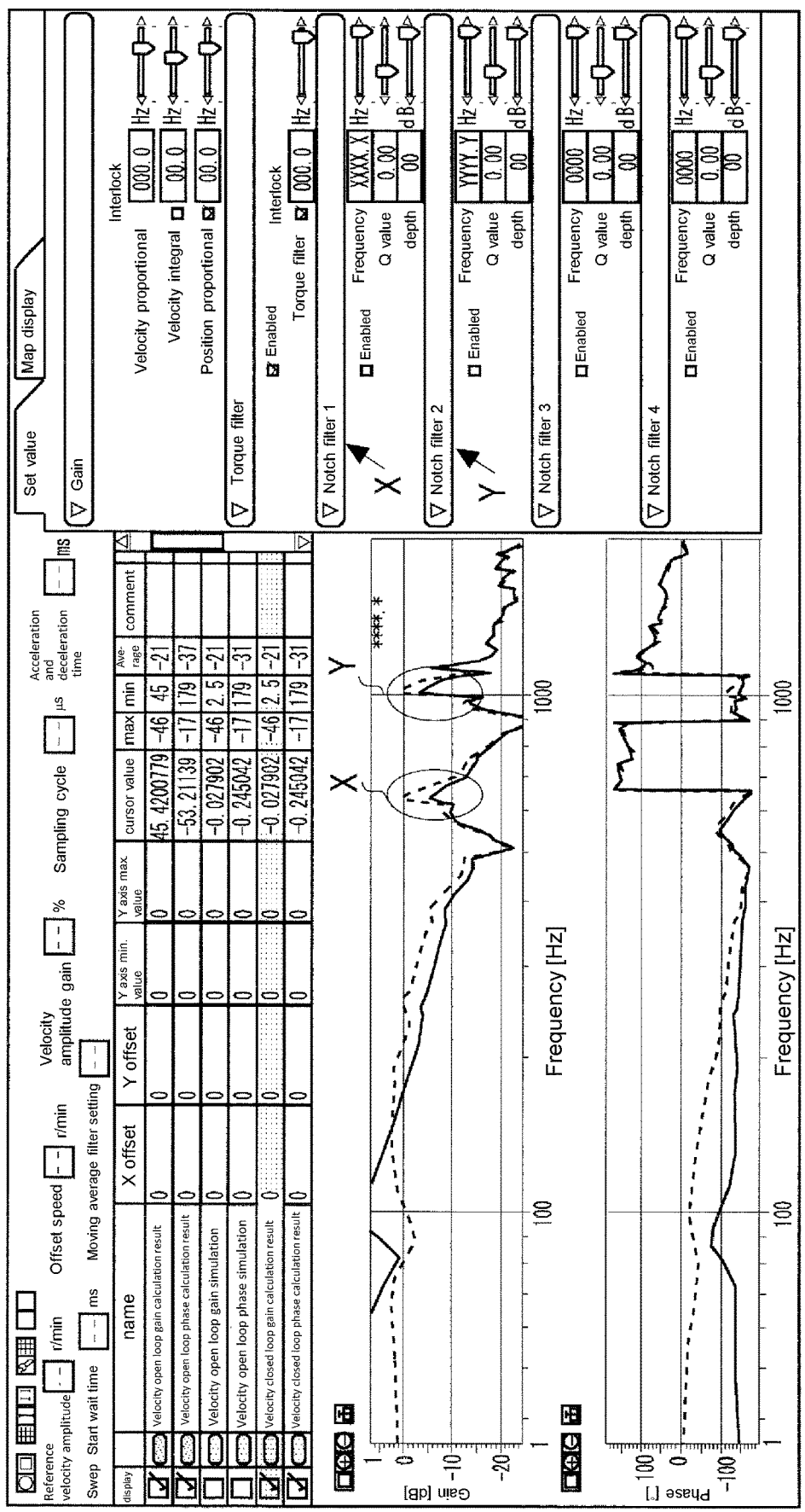
FIG. 4 is a diagram showing an example of the adjustment screen on which an initial value setting of the resonance frequencies obtained by the peak search to the slider bars is performed.

FIG. 4 is an example of the adjustment screen on which an initial value setting of the resonance frequencies searched through the peak search of the resonance frequency to the slider bars is performed. The screen configuration of FIG. 4 is the same as that of FIG. 3.

In FIG. 4, measurement results of the velocity open loop gain/phase characteristic and the velocity closed loop gain/phase characteristic are displayed in the display area of the Bode plot. The velocity open loop characteristics are displayed as solid line graphs, and the velocity closed loop characteristics are displayed as broken line graphs. X circled by a solid line represents a resonance point on the low frequency side, and Y circled by a solid line represents a resonance point on the high frequency side. The frequency at the resonance point on the low frequency side is "XXXX.X" Hz, and the frequency at the resonance point on the high frequency side is "YYYY.Y" Hz.

The adjustment device 10, for example, performs a peak search from the low frequency side on the measurement result displayed in the Bode plot and identifies the resonance points X and Y respectively. Then, the adjustment device 10 sets the peak frequency of each identified resonance point as the initial value of the slider bar sequentially from notch filter 1.

The peak frequency "XXXX.X" of the resonance point X is set as the initial value in the display box representing the "frequency" of notch filter 1 corresponding to the resonance point X on the low frequency side in FIG. 4. Further, the peak frequency "YYYY.Y" of the resonance point Y is set as the initial value in the display box representing the "frequency" of notch filter 2 corresponding to the resonance point Y on the high frequency side. In addition, at the time of the initial value setting of the resonance frequencies obtained by the peak search to the slider bars, the selection state indicated by the radio button "enabled" of notch filters 1 and 2 become disabled.

Figure 5:
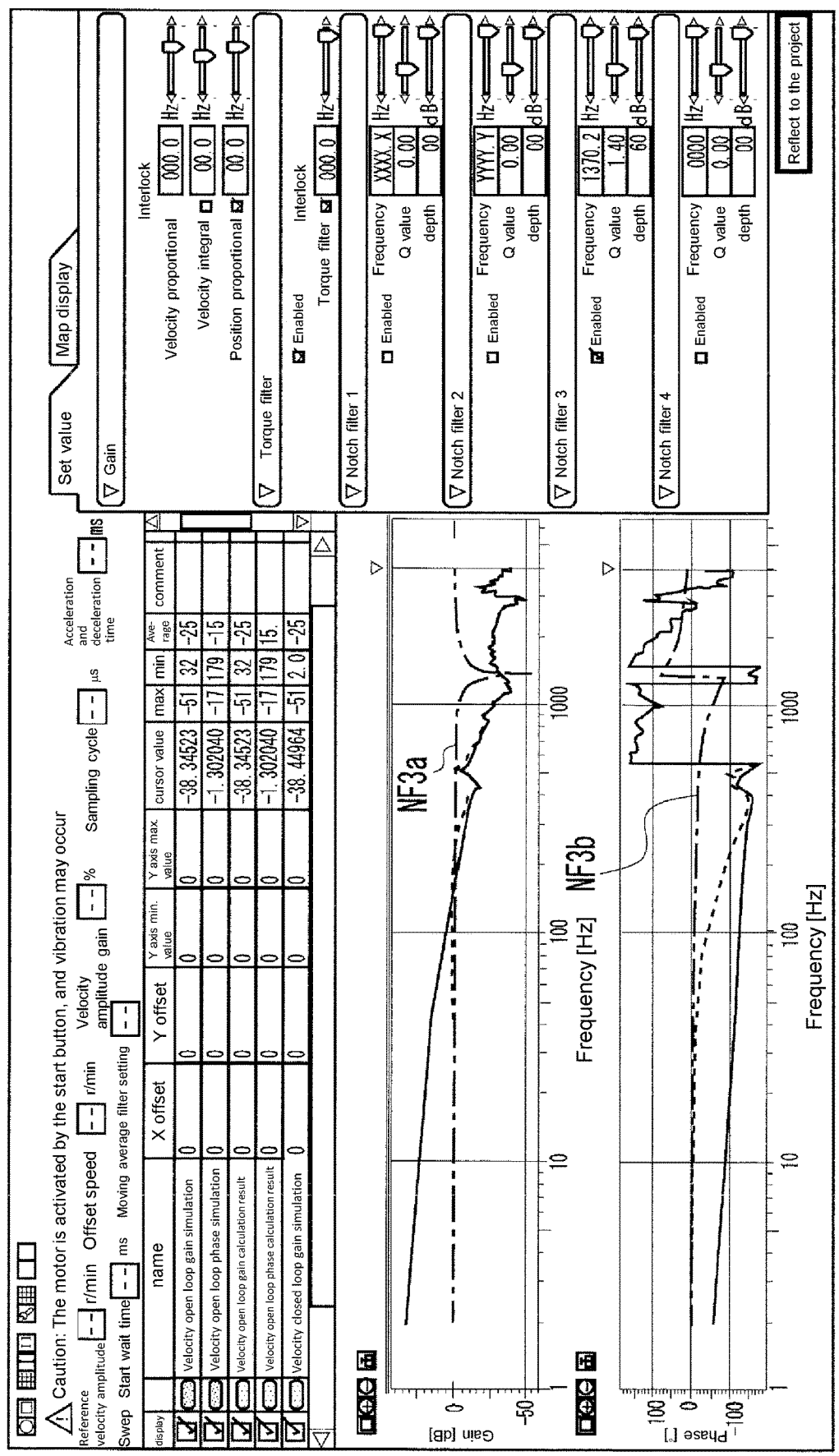
FIG. 5 is a diagram showing an example of the adjustment screen during a simulation of a notch filter.

FIG. 5 is an example of the adjustment screen at the time of adjusting the notch filter characteristics. The one-dot chain line graphs NF3a and NF3b shown in the display area of the Bode plot of FIG. 5 respectively represent simulation graphs of the velocity open loop gain characteristic and phase characteristic when "notch filter 3" is selected as the adjustment item.

In a state where the measurement results shown in FIG. 4 are displayed in the Bode plot, the user can, for example, select notch filter 3 as the adjustment item while referring to the peak frequencies of the resonance points X and Y set as the initial values in the display boxes of the frequency of notch filter 1 and the frequency of notch filter 2. Then, for example, the user operates the slider bars and the operation buttons for fine adjustment associated with each of "the frequency", "the Q value", and "the depth" for adjusting the filter characteristics of notch filter 3 and sets control values that indicate the characteristics of notch filter 3. After setting the characteristics of notch filter 3, the user, for example, puts the radio buttons of the velocity open loop gain simulation and the velocity open loop phase simulation in the area A2 shown in FIG. 3 into a selected state, enables the radio button "enabled" of notch filter 3, and executes each simulation.

The adjustment device 10 executes the velocity open loop gain/phase simulation based on each characteristic value of notch filter 3 and displays the execution result in the display area of the Bode plot. As shown in FIG. 5, the velocity open loop gain simulation graph NF3a and the velocity open loop phase simulation graph NF3b performed based on the characteristic values set in notch filter 3 are displayed superimposed on each graph of the velocity open loop gain/phase characteristic and velocity closed loop gain/phase characteristic of the measurement results.

In FIG. 5, when the operation of the slider bars and the like for adjusting each characteristic is performed while the radio button "enabled" of notch filter 3 remains in the enabled state, the adjustment device 10 reflects the operation amounts during the operation and executes the velocity open loop gain/phase simulation. On the adjustment screen, while the graphs of the measurement results displayed in the Bode plot remain fixed, the velocity open loop gain simulation graph NF3a and the velocity open loop phase simulation graph NF3b of notch filter 3 reflect the operation amounts during the operation and change the shapes.

Figure 6:
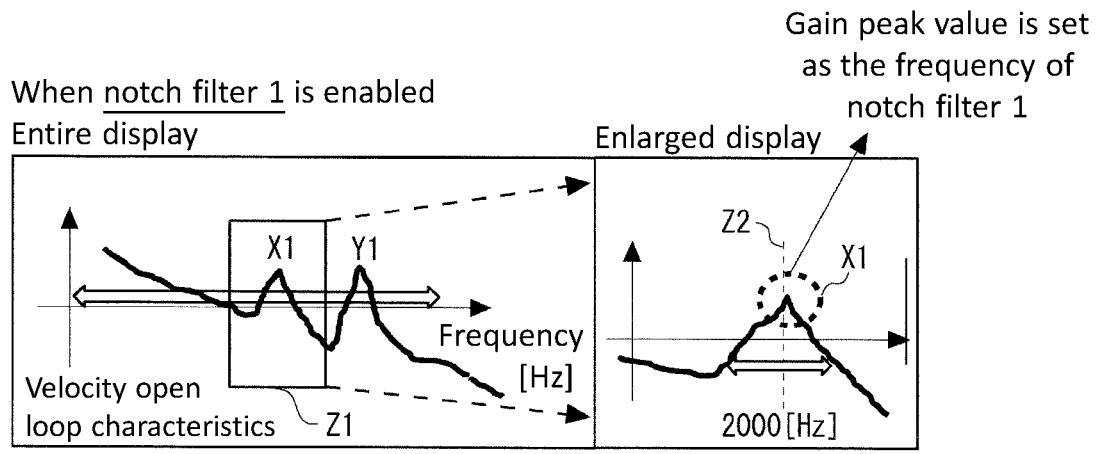
FIG. 6 is a diagram showing a screen example of an entire display for notch filter adjustment and an enlarged display for notch filter adjustment.
Figure 7:
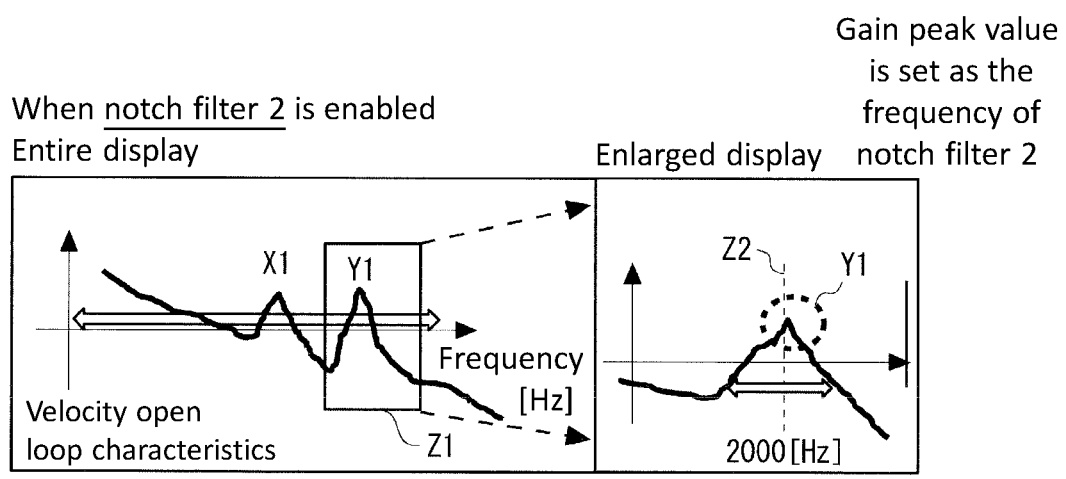
FIG. 7 is a diagram showing a screen example of an entire display for notch filter adjustment and an enlarged display for notch filter adjustment.

FIGS. 6 and 7 are diagrams showing screen examples of an entire display for notch filter adjustment and an enlarged display for notch filter adjustment. FIGS. 6 and 7 show, for example, an example of displaying an entire display for notch filter adjustment (hereinafter also referred to as the "entire display") and an enlarged display for notch filter adjustment (hereinafter also referred to as the "enlarged display") side by side in the display area of the frequency characteristic of the Bode plot. FIG. 6 shows a display mode of notch filter 1 when the radio button is "enabled", and FIG. 7 shows a display mode of notch filter 2 when the radio button is "enabled".

As shown in FIG. 6, in the entire display, the frequency characteristic is displayed so that a plurality of resonance points (X1 and Y1) to be adjusted by the notch filters are included. However, when the entire display and the enlarged display are placed side by side, the areas placed side by side are limited to the size of the display area in which the Bode plot is displayed. Therefore, for example, the adjustment device 10 may make the display unit frequency coarse (such as 20 Hz) for displaying the entire display. It is sufficient if at least the change tendency of the gain with respect to the frequency in the vicinity of the plurality of resonance points (X1, Y1) to be adjusted by the notch filters can be determined.

In addition, the adjustment device 10 may also limit the frequency range when performing the entire display. FIG. 8 is a diagram for illustrating the case of limiting the frequency range used for the entire display from the frequency characteristic of the measurement result. For example, when the number of FFT sampling points is 4096 points, the display range of the frequency characteristic is displayed in a frequency range of 4000 Hz from the lower limit value of the FFT resolution.

As shown in FIG. 8, when performing the entire display for notch filter adjustment from the frequency characteristic, for example, the lower limit value of the frequency at the time of display can be set near the velocity proportional gain (Kvp). The adjustment device 10 can identify the frequency range in which the filter effect should be confirmed and provide it to the user by setting the lower limit value of the frequency of the entire display for notch filter adjustment near the velocity proportional gain (Kvp). In the adjustment device 10, confirmation of the filter effect is facilitated, and shortening of the time required to determine appropriate filter characteristics can be expected.

With reference back to FIG. 6, the adjustment device 10 can represent the frequency range to be displayed in enlargement in the entire display in a rectangular frame Z1. For example, the peak frequency (resonance frequency) of the resonance point X1 is set as the initial value of the center frequency of the slider bar of notch filter 1. The adjustment device 10 can enclose the vicinity of the resonance point X1 with the rectangular frame Z1, and extract and display in enlargement the area of the frequency characteristic enclosed by the rectangular frame Z1 when the radio button "enabled" of notch filter 1 is enabled.

In the enlarged display of FIG. 6, the adjustment device 10 can perform an enlarged display so that at least the change tendency of the gain with respect to the frequency in the vicinity of the resonance point X1 can be easily adjusted by determining the shape of the notch filter. Further, as indicated by a broken line Z2, the adjustment device 10 may display a frequency marker indicating the peak frequency (the resonance frequency) of the resonance point X1.

The display mode of the entire display and the enlarged display described with reference to FIG. 6 is also applicable to the display mode of FIG. 7. However, as shown in FIG. 7, the peak frequency (the resonance frequency) of the resonance point Y1 is set as the initial value of the center frequency of the slider bar of notch filter 2. Therefore, the area of the frequency characteristic enclosed by the rectangular frame Z1 is in the vicinity of the resonance point Y1. The area of the frequency characteristic in the vicinity of the resonance point Y1 enclosed by the rectangular frame Z1 can be extracted and displayed in enlargement when the radio button "enabled" of notch filter 2 is enabled.

In the adjustment device 10, the characteristics of the notch filter are set based on the frequency characteristic displayed in enlargement. In the adjustment device 10, for example, the adjusted notch filter setting may be held for a plurality of times in a predetermined area of the main storage device 12. In the adjustment device 10, for example, the notch filter characteristics held in the predetermined area of the main storage device 12 can be read and reused via an Undo function.

(Case 4)

As described in Case 1, in the embodiment, the characteristics (the center frequency, the Q value, and the depth) of the notch filter are set based on the operation directions and the operation amounts of the slider bars and the like displayed on the adjustment screen. Here, the notch filter characteristic can be set according to the shape of the notch filter.

FIG. 9 is a diagram for illustrating an operation of setting filter characteristics in accordance with the shape of the notch filter. In FIG. 9, a graph g1 is a graph of the frequency characteristic displayed in the Bode plot. MC1, MC2 and MC3 indicated by broken lines represent measuring cursors displayed superimposed on the frequency characteristic.

In Case 4, for example, when the notch filter is selected as the adjustment item, the adjustment device 10 displays the measuring cursors MC1, MC2 and MC3, which can be operated by the user, superimposed on the frequency characteristic. Here, the measuring cursors MC1, MC2 and MC3 are markers for identifying the center frequency, the filter width, and the filter depth of the notch filter sequentially.

The adjustment device 10 receives, for example, the user's selection operation on each of the measuring cursors displayed superimposed on the frequency characteristic. The selection operation is identified by, for example, a click operation in a state where the cursor is superimposed on each measuring cursor. For example, when any of the measuring cursors is selected, the adjustment device 10 moves the measuring cursor to be operated according to the rotation direction and the operation amount of the mouse wheel. For example, the measuring cursors MC1 and MC3 move the frequency area in the Bode plot, in which the frequency characteristic is displayed, in the left-and-right direction. Further, for example, the measuring cursor MC2 moves the gain area in the Bode plot, in which the frequency characteristic is displayed, in the up-and-down direction.

For example, at the time of operating the measuring cursor MC1, the adjustment device 10 acquires a frequency indicated by the measuring cursor MC1, interlocks the slider bar for setting the frequency with it, and displays the frequency value in the display box. Similarly, the adjustment device 10 acquires an indicated value (the gain value) at the time of operating the measuring cursor MC2, interlocks the slider bar for setting the filter depth with it, and displays the depth value in the display box. Further, the adjustment device 10 acquires an indicated value (the frequency value) at the time of operating the measuring cursor MC3, interlocks the slider bar for setting the filter width with it, and displays the Q value in the display box.

The adjustment device 10 provides the user-operable measuring cursors MC1, MC2 and MC3 displayed superimposed on the frequency characteristic and thereby can provide the setting operation of the notch filter characteristics according to the attenuation shape of the frequency characteristic displayed in the Bode plot. In the adjustment device 10, the notch filter shape can be set in accordance with the graph shape of the frequency characteristic displayed in the Bode plot.

(Case 5)

In the adjustment device 10, the response characteristics based on the measurement results or the response characteristics based on the simulation results are displayed as the frequency characteristic and the phase characteristic in a frequency range of 4000 Hz from the lower limit value of the FFT resolution in the Bode plot. The adjustment device 10 enlarges/reduces the display range centering on the frequency position on the response characteristic graph and the phase characteristic graph indicated by the cursor.

Figure 10:
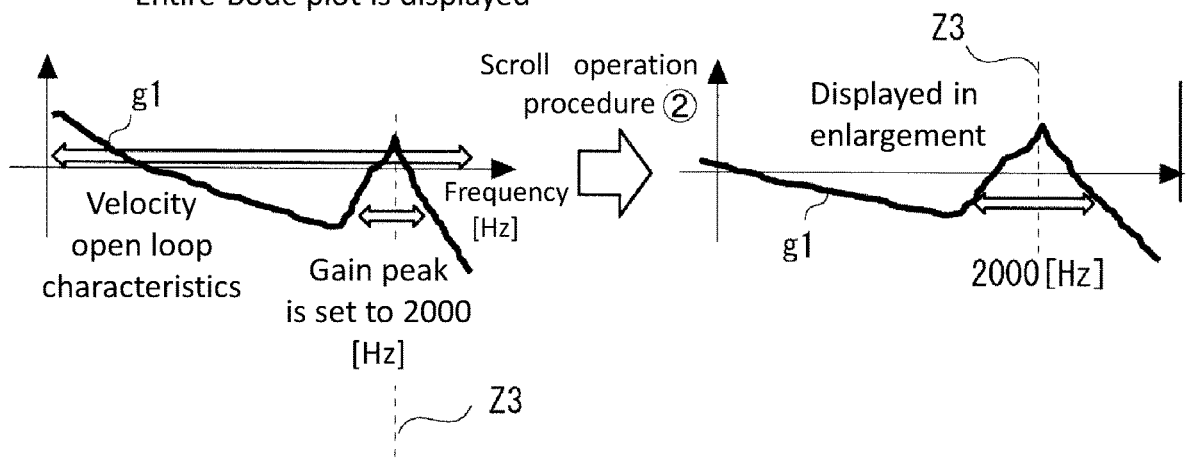
FIG. 10 is a diagram for illustrating the enlargement/reduction of the response characteristics displayed in the Bode plot.

FIG. 10 is a diagram for illustrating the enlargement/reduction of each graph of the response characteristics displayed in the Bode plot. In FIG. 10, the graph g1 represents a response characteristic graph based on the measurement result or the simulation result.

In Case 5, the adjustment device 10 receives a click operation in a state where the cursor is superimposed on the graph g1 and identifies the frequency value indicated by the cursor. In addition, the adjustment device 10 may display a frequency marker Z3 indicated by a broken line when receiving the click operation. In FIG. 10, the frequency position performed with the click operation is assumed to be 2000 Hz.

The adjustment device 10 receives the mouse wheel operation performed after the click operation and enlarges/reduces the display range of the response characteristic displayed in the Bode plot according to the rotation direction and the operation amount of the mouse wheel. The enlargement/reduction of the display range is performed centering on the frequency value (the display position of the frequency marker Z3) indicated by the cursor. In addition, in the enlargement/reduction of the display range, the display range of the gain value and the phase value is not changed, but the frequency range is changed.

The adjustment device 10 can provide a user interface that facilitates the enlargement/reduction operation during the entire display of the response characteristics. In addition, the adjustment device 10 may indicate the selection of the direction of enlargement/reduction with the mouse wheel and perform enlargement/reduction according to the number of click operations performed after the indication. According to the repetition of the click operation, the enlargement/reduction display can be performed.

Further, the adjustment device 10 may limit the display range of the response characteristics during the enlargement/reduction operation. FIG. 11 is a diagram for illustrating the limitation of the display range during the enlargement/reduction operation. Part (1) of FIG. 11 is a diagram showing a display state of the response characteristic before the enlargement/reduction operation. Part (2) of FIG. 11 is a diagram showing a state where the display range is limited. In the part (1) and the part (2) of FIG. 11, the graph g1 represents a response characteristic graph based on the measurement result or the simulation result.

In the part (1) of FIG. 11, the cut-off frequency (the cutoff frequency) of the torque filter that limits the torque output of the response characteristic is assumed to be 100 Hz. Further, the resonance frequency at which the characteristics of the notch filter are adjusted is assumed to be 2000 Hz. As shown in the part (2) of FIG. 11, in the adjustment device 10, for example, the lower limit value of the display frequency can be set to 50 Hz, which is less than or equal to the cut-off frequency, and the display range during the enlargement/reduction operation can be set to ¾ of the maximum display area (such as 4000 Hz). The display range during the enlargement/reduction operation in the part (2) of FIG. 11 is limited to the frequency range of 50 Hz to 3050 Hz. The limited frequency range includes the cut-off frequency and the resonance frequency (2000 Hz) of the torque filter. The adjustment device 10 presents the information necessary at the time of adjusting the filter characteristics and then can reduce the processing load related to the display during the enlargement/reduction operation.

In addition, the adjustment device 10 can interlock the operation amounts of the slider bars according to the enlargement/reduction operation during the enlargement/reduction operation of the Bode plot as described above. In the adjustment device 10, the operation amounts of the slider bars are interlocked with the enlargement/reduction operation of the display range, whereby the adjustment operation via the slider bars are facilitated.

<4. Processing Flow>

Figure 12:
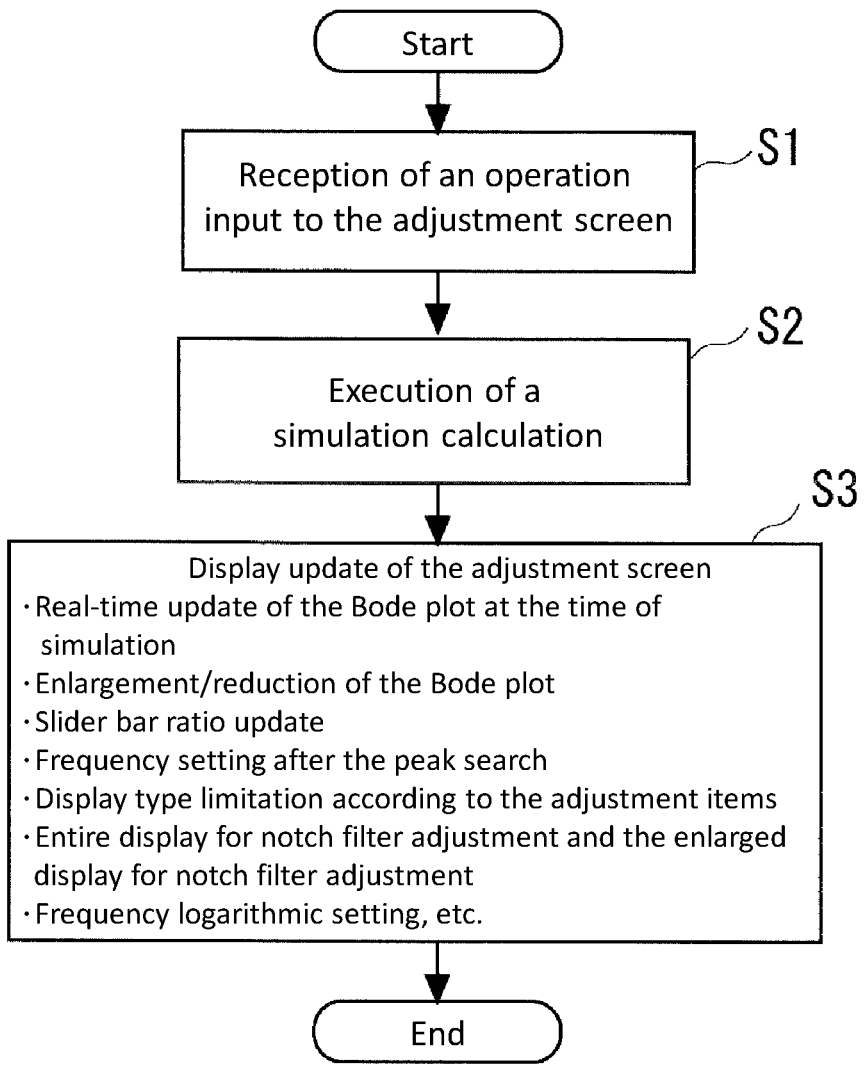
FIG. 12 is a flowchart showing an example of user interface processing according to an embodiment.

Next, user interface processing according to the embodiment will be described with reference to FIG. 12. FIG. 12 is a flowchart showing an example of the user interface processing provided by the adjustment device 10. The adjustment device 10 of the embodiment provides the user interface processing shown in FIG. 12 by, for example, the CPU 11 or the like reading and executing various programs and various data stored in the auxiliary storage device 13.

In the flowchart of FIG. 12, the start of the processing is exemplified by, for example, the time of displaying the servo parameter adjustment screen shown in FIG. 3. The adjustment device 10 receives an operation input such as a click operation or a wheel operation performed in a state where the cursor is superimposed on the GUI element displayed on the adjustment screen or the graph displayed in the Bode plot (S1). The GUI elements displayed on the adjustment screen include the slider bars, the operation buttons for fine adjustment, and the radio buttons described with reference to FIG. 3 and the like, and the measuring cursors described with reference to FIG. 9, and the like. The adjustment device 10 temporarily stores the received operation input in a predetermined area of the main storage device 12 in association with the GUI element or the display position of the cursor.

When the notch filter is selected as the adjustment item on the adjustment screen and the radio button is enabled, the adjustment device 10 performs a simulation calculation of the response characteristics displayed in the Bode plot according to the set values set by the slider bars and the operation buttons for fine adjustment received in the processing of S1 (S2).

Regarding the simulation while the slider bars and the like are being operated, the adjustment device 10, for example, sets the frequency resolution when performing the FFT analysis reflecting the notch filter shape to be coarse and performs the calculation of the frequency characteristic. Alternatively, the adjustment device 10, for example, performs calculation of the frequency characteristic limited to the frequency band affected by the notch filter.

The adjustment device 10 transfers the simulation results calculated according to the set values of the slider bars and the like received in the processing of S1 to the processing of S3. In addition, when the simulation calculation is not performed, the adjustment device 10 skips the processing of S2 and proceeds to the processing of S3.

In the processing of S3, the adjustment device 10 displays the simulation results transferred from the processing of S2 in the Bode plot of the adjustment screen. The simulation results are displayed, for example, as velocity open loop and velocity closed loop gain simulation graphs and velocity open loop and velocity closed loop phase simulation graphs in the Bode plot. In addition, while the slider bars and the like are being operated, the above simulation graphs of the response characteristics are updated in real time according to the set values of the slider bars and the like.

Further, in the processing of S3, the adjustment device 10 updates the display mode of the adjustment screen as described by Cases 2 to 5 according to the operation input received in the processing of S1. The adjustment device 10 ends the processing of FIG. 12 after the processing of S3.

In addition, the above-described embodiment can be modified and implemented as appropriate in the range without departing from the idea of the disclosure. In the above-described embodiment, the operation input on the adjustment screen is described with the click operation or the wheel operation of a mouse, but the operation input may be a touch operation input via a touch panel or a touch pad.

What is claimed is:

1. A servo parameter adjustment device, comprising:
    a processor, configured to:
        display an adjustment screen for adjusting a servo parameter set in a servo control device of a motor that drives a control target;
        receive a set value of the servo parameter which is variable according to an operation direction and an operation amount associated with a slide operation of a slider bar displayed on the adjustment screen;
        perform an FFT analysis of a response characteristic of a speed control or a position control of the motor performed according to a predetermined servo parameter and generates graph data of a frequency characteristic and a phase characteristic for displaying an FFT analysis result of the response characteristic on the adjustment screen; and
        display the frequency characteristic and the phase characteristic in a predetermined area of the adjustment screen based on the generated graph data,
    wherein the processor performs a simulation in which a set value of the servo parameter received during a slide operation period of the slider bar is reflected in an FFT analysis result of the response characteristic of the speed control or the position control and generates graph data of the simulated frequency characteristic and phase characteristic,
    the processor updates a display of a frequency characteristic and a phase characteristic of the adjustment screen based on graph data of the simulated frequency characteristic and phase characteristic, and
    the processor searches from a low frequency area for a peak frequency at which a gain value related to the speed control reaches a peak from graph data of the frequency characteristic, and sets and displays the searched peak frequency as an initial value of the slider bar, which is operated by a slide operation, of a servo parameter to be adjusted.

2. The servo parameter adjustment device according to claim 1, wherein during the slide operation period of the slider bar, the processor performs a simulation by reducing an accuracy of a frequency resolution at the time of an FFT analysis.

3. The servo parameter adjustment device according to claim 1, wherein during the slide operation period of the slider bar, the processor performs a simulation by limiting a frequency range used at the time of an FFT analysis.

4. The servo parameter adjustment device according to claim 1, wherein the processor receives a set value of the servo parameter which is variable according to an indication direction and an indication position associated with an operation of a plurality of measuring cursors displayed superimposed on graph data of a frequency characteristic and a phase characteristic displayed in a predetermined area of the adjustment screen.

5. The servo parameter adjustment device according to claim 1, wherein the processor receives a set value of the servo parameter which is variable according to an operation direction and an operation amount associated with a slide operation of the slider bar displayed on the adjustment screen and according to an operation amount of buttons for fine adjustment provided at both ends of the slider bar.

6. The servo parameter adjustment device according to claim 1, wherein
    the processor receives a predetermined operation input to a cursor displayed superimposed on graph data of a frequency characteristic and a phase characteristic displayed in a predetermined area of the adjustment screen, and
    the processor performs an enlarged display or a reduced display of graph data of the frequency characteristic and the phase characteristic centering on a frequency indicated by the cursor when the predetermined operation input is performed.

7. The servo parameter adjustment device according to claim 6, wherein, when an enlarged display or a reduced display of graph data of the frequency characteristic and the phase characteristic is performed, the processor converts and receives an operation amount associated with a slide operation of the slider bar in association with a relative ratio of the enlarged display or a relative ratio of the reduced display.

8. The servo parameter adjustment device according to claim 1, wherein
    the processor receives an adjustment selection for a predetermined servo parameter displayed on the adjustment screen, and
    the processor limits a display target displayed on the adjustment screen according to a type of the predetermined servo parameter for which the adjustment selection has been received.

9. The servo parameter adjustment device according to claim 1, wherein, when a plurality of searched peak frequencies exist, the processor sorts the peak frequencies in ascending order, and sets and displays the sorted peak frequencies as initial values of slider bars, which are operated by slide operations, of servo parameters to be adjusted.

10. The servo parameter adjustment device according to claim 1, wherein, when an adjustment state of a servo parameter of which the searched peak frequency is set and displayed as an initial value of the slider bar satisfies a predetermined condition, the processor extracts and displays in enlargement graph data of a predetermined frequency range centering on at least the peak frequency.

11. The servo parameter adjustment device according to claim 10, wherein the processor displays graph data before extraction together with the graph data displayed in enlargement.

12. The servo parameter adjustment device according to claim 11, wherein the processor limits a frequency range of graph data before extraction, which is displayed together with the graph data displayed in enlargement.

13. The servo parameter adjustment device according to claim 11, wherein the processor limits a lower limit value of a frequency of graph data before extraction, which is displayed together with the graph data displayed in enlargement, to a vicinity of a velocity proportional gain related to a speed control.

14. The servo parameter adjustment device according to claim 1, wherein, when an operation amount of the slider bar is a frequency, the processor receives a logarithmic frequency obtained by logarithmically converting the frequency as a set value.

15. The servo parameter adjustment device according to claim 1, wherein the processor holds the servo parameter received through a slide operation of the slider bar.

16. A servo parameter adjustment method comprising:
- a step that displays an adjustment screen for adjusting a servo parameter set in a servo control device of a motor that drives a control target;
- a reception step that receives a set value of the servo parameter which is variable according to an operation direction and an operation amount associated with a slide operation of a slider bar displayed on the adjustment screen;
- a calculation step that performs an FFT analysis of a response characteristic of a speed control or a position control of the motor performed according to a predetermined servo parameter and generates graph data of a frequency characteristic and a phase characteristic for displaying an FFT analysis result of the response characteristic on the adjustment screen; and
- a display control step that displays the frequency characteristic and the phase characteristic in a predetermined area of the adjustment screen based on the generated graph data generated by the calculation step,
- wherein the calculation step performs a simulation in which a set value of the servo parameter received during a slide operation period of the slider bar is reflected in an FFT analysis result of the response characteristic of the speed control or the position control and graph data of the simulated frequency characteristic and phase characteristic,
- the display control step updates a display of a frequency characteristic and a phase characteristic of the adjustment screen based on graph data of the simulated frequency characteristic and phase characteristic, and
- the display control step searches from a low frequency area for a peak frequency at which a gain value related to the speed control reaches a peak from graph data of the frequency characteristic, and sets and displays the searched peak frequency as an initial value of the slider bar, which is operated by a slide operation, of a servo parameter to be adjusted.

* * * * *